United States Patent
Bliss et al.

(10) Patent No.: US 8,264,969 B2
(45) Date of Patent: Sep. 11, 2012

(54) COMMUNICATIONS LINK HEALTH MONITORING

(75) Inventors: David E. Bliss, Loomis, CA (US); Michael A. Benning, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 530 days.

(21) Appl. No.: 12/609,070

(22) Filed: Oct. 30, 2009

(65) Prior Publication Data

US 2011/0105923 A1   May 5, 2011

(51) Int. Cl.
*H04L 1/00* (2006.01)
(52) U.S. Cl. ........................................ 370/241; 370/252
(58) Field of Classification Search .................. None
See application file for complete search history.

(56) References Cited

U.S. PATENT DOCUMENTS

| 5,835,500 | A | 11/1998 | Schiller |
| 6,697,577 | B1* | 2/2004 | Li et al. .......................... 398/202 |
| 6,721,909 | B2 | 4/2004 | Butler |
| 2005/0207360 | A1* | 9/2005 | Costo et al. .................... 370/282 |
| 2008/0025416 | A1* | 1/2008 | Jafarkhani et al. ............ 375/245 |

* cited by examiner

*Primary Examiner* — Steven H Nguyen

(57) ABSTRACT

A reference signal of reference pulses occurring at a uniform reference pulse rate is received. An error event signal of error event pulses occurring at a variable error event pulse rate corresponding to a rate of detected error event occurrences is received. An integrator output signal is produced from the reference signal and the error event signal. The integrator output signal has a value that approaches a first boundary threshold when the reference pulse rate exceeds the error event pulse rate and approaches a second boundary threshold when the error event pulse rate exceeds the reference pulse rate. A decision signal is set to a first value in response to a determination that the value of the received integrator output signal meets a first decision threshold and set to a second value in response to a determination that the value of the received integrator output signal meets a second decision threshold.

20 Claims, 4 Drawing Sheets

COMMUNICATIONS LINK HEALTH MONITORING

BACKGROUND

A communications link carries data from a transmitter at one end of the communications link to a receiver at the opposite end of the communications link. The receiver typically includes a communications link health monitor that monitors errors in communications transmitted across. The output of the communications link health monitor is used to determine when to take the communications link out of service. Communications link health monitors typically are designed to trigger the decommissioning of the communications links when the detected error rate exceeds a certain level for too long.

SUMMARY

In one aspect, the invention features a method in which a reference signal of reference pulses occurring at a uniform reference pulse rate is received. An error event signal of error event pulses occurring at a variable error event pulse rate corresponding to a rate of detected error event occurrences is received. An integrator output signal is produced from the reference signal and the error event signal. The integrator output signal has a value that approaches a first boundary threshold when the reference pulse rate exceeds the error event pulse rate and approaches a second boundary threshold when the error event pulse rate exceeds the reference pulse rate. A decision signal is set to a first value in response to a determination that the value of the received integrator output signal meets a first decision threshold and is set to a second value in response to a determination that the value of the received integrator output signal meets a second decision threshold.

The invention also features apparatus operable to implement the method described above and computer-readable media storing computer-readable instructions causing a computer to implement the method described above.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments.

As used herein, a value "between" a first threshold and a second threshold includes the values of the first and second thresholds as well as values in the interval that separates the first and second thresholds.

I. Introduction

The embodiments that are described herein provide improved communications link health monitoring systems and methods that are capable of automatically distinguishing acceptable non-detrimental bursts of intermittent errors from unacceptable detrimental bursts of intermittent errors in a way that can be readily tailored for monitoring different types of communication errors. Some embodiments combine the outputs of multiple communications link health monitors, which are tuned to monitor different types of communications link errors, to provide an overall indication of the health of a communications link.

II. Link Monitoring

Figure 1:
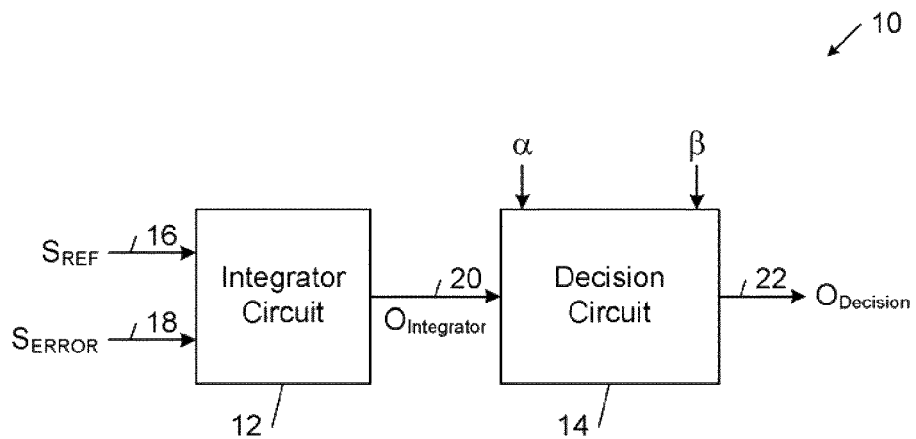
FIG. 1 is a block diagram of an embodiment of a communications link health monitor circuit.

FIG. 1 shows an embodiment of a communications link health monitor circuit 10 that includes an integrator circuit 12 and a decision circuit 14. The integrator circuit 12 has a first input 16 for receiving a reference signal ($S_{REF}$) and a second input for receiving an error event signal ($S_{ERROR}$). The reference signal typically consists of digital pulses that occur at a uniform rate (i.e., constant frequency). The error event signal typically consists of digital pulses that occur at a variable error event pulse rate corresponding to a rate of error event occurrences that are detected in a communications link. Based on the relative pulse rates in the reference signal 16 and the error event signal 18, the integrator circuit 12 produces an integrator output signal 20 ($O_{Integrator}$) that distinguishes acceptable non-detrimental bursts of intermittent errors from unacceptable detrimental bursts of intermittent errors in a way that can be readily tailored for monitoring different types of communication errors. The decision circuit 14 produces a decision signal 22 ($O_{Decision}$) based on application of first and second decision thresholds α, β to the integrator output signal 20.

Figure 2:
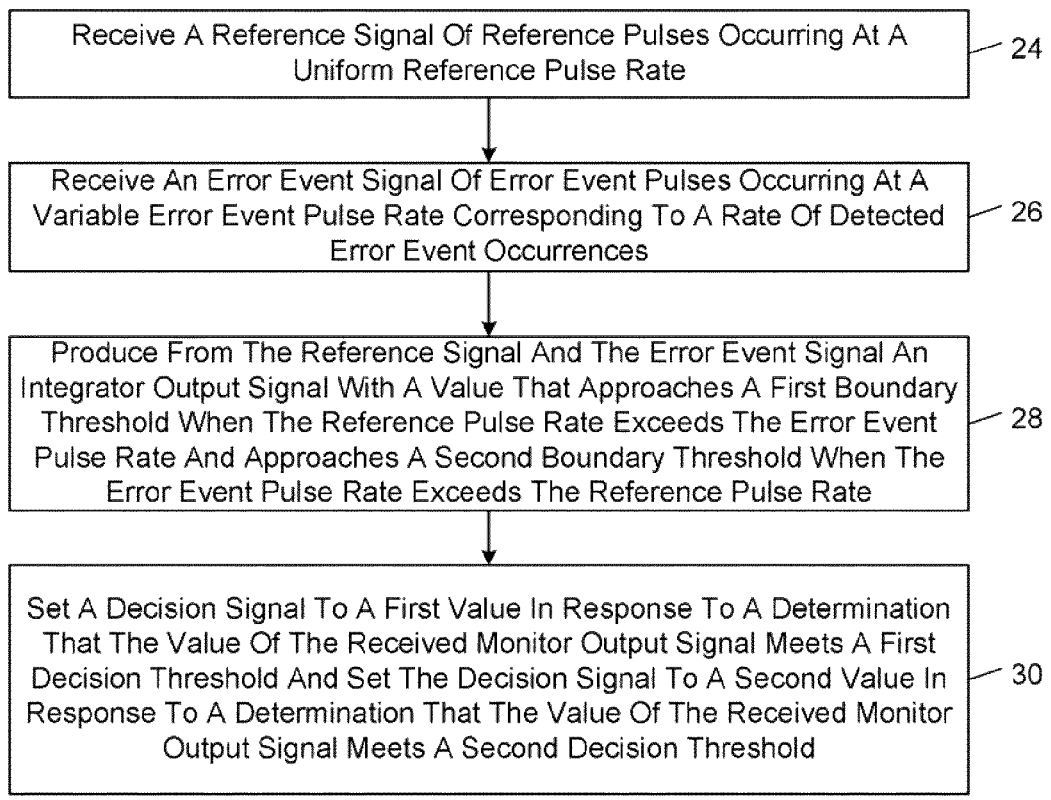
FIG. 2 is a flow diagram of an embodiment of a communications link health monitoring method.

FIG. 2 shows an embodiment of a communications link health monitoring method that is performed by the communications link health monitor circuit 10.

In accordance with the method of FIG. 1, the integrator circuit 12 receives the reference signal 16 ($S_{REF}$) of reference pulses occurring at a uniform reference pulse rate (FIG. 2, block 24). The integrator circuit 12 also receives an error event signal 18 ($S_{ERROR}$) of error event pulses occurring at a variable error event pulse rate corresponding to a rate of detected error event occurrences (FIG. 2, block 26). The integrator circuit 12 produces from the reference signal 16 and the error event signal 18 an integrator output signal 20 with a value that approaches a first boundary threshold when the reference pulse rate exceeds the error event pulse rate and approaches a second boundary threshold when the error event pulse rate exceeds the reference pulse rate (FIG. 2, block 28).

The decision circuit 14 sets the decision signal 22 to a first value in response to a determination that the value of the received monitor output signal meets a first decision threshold α and sets the decision signal 22 to a second value in response to a determination that the value of the received monitor output signal meets a second decision threshold β (FIG. 2, block 30).

In some embodiments, the first boundary threshold is higher than the second decision threshold, the first decision threshold is higher than or equal to the second decision threshold, and the second decision threshold is higher than the second boundary threshold.

Figure 3:
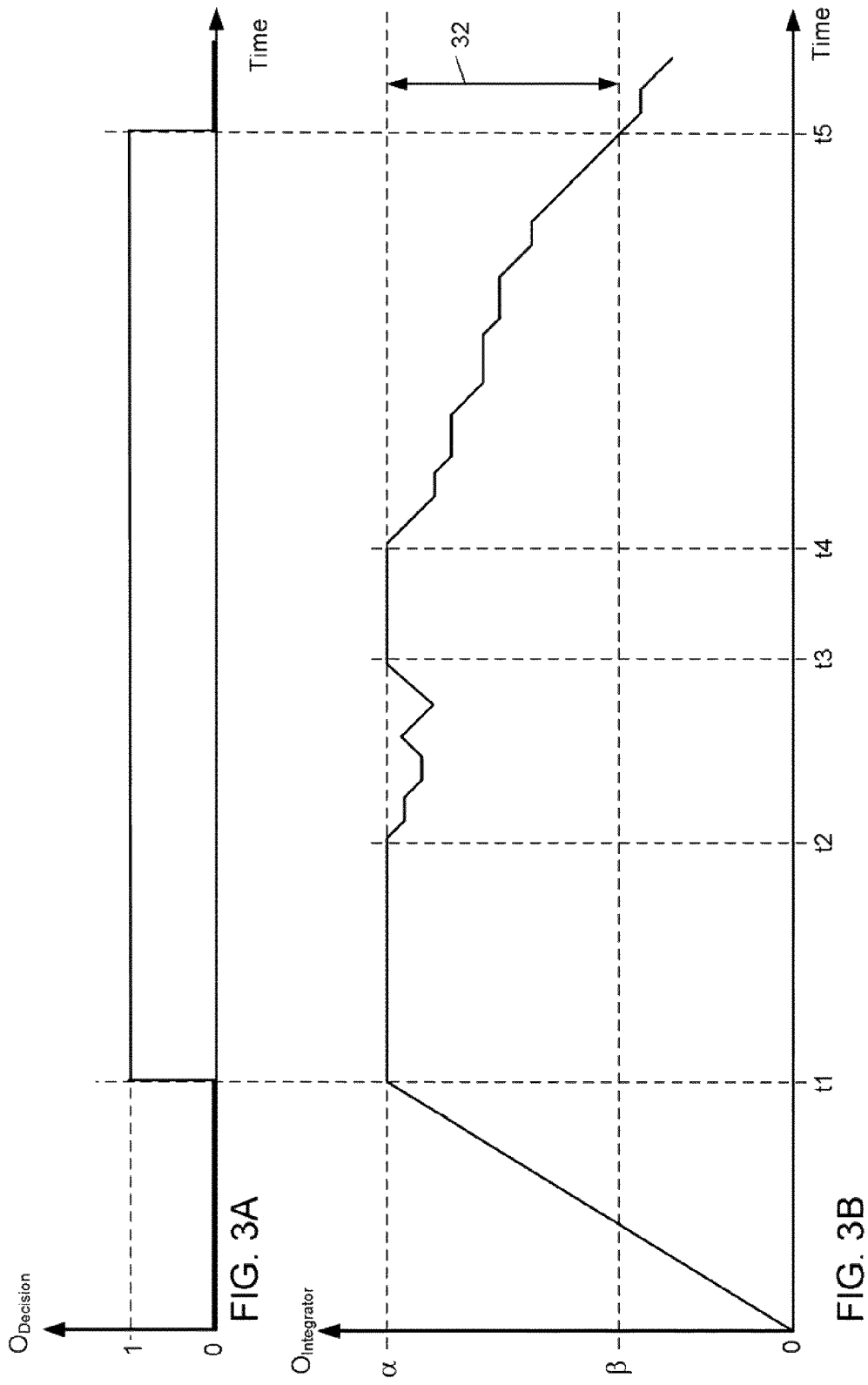
FIG. 3A is a devised graph of a decision signal produced by an exemplary embodiment of the communications link health monitor circuit of FIG. 1.
FIG. 3B is a devised graph of an integrator output signal produced by an exemplary embodiment of the communications link health monitor circuit of FIG. 1.

FIGS. 3A and 3B respectively show devised graphs of the decision signal ($O_{Decision}$) and the integrator output signal 20 ($O_{Integrator}$) that are produced by a devised embodiment of the communications link health monitor circuit 10 plotted as a function of time. In this example, the first boundary threshold coincides with the first decision threshold α, the second boundary threshold is zero, and the second decision threshold β is between the first and second boundary thresholds.

The graphs of FIGS. 3A and 3B show an initial period from time 0 to time t1 during which the communications link health monitor circuit is starting and there is no data being received by the receiver that is associated with the communications link health monitor circuit 10. During this period, the integrator output signal 20 ($O_{Integrator}$) increases at a constant rate until it reaches the first boundary threshold (α), where the integrator output signal 20 saturates. At this point, the decision signal 22 ($O_{Decision}$) is set to the first value (i.e., "1") indicating that the communications link is healthy and ready for service.

In the next period from time t1 to time t2, the receiver is receiving data, but the reference pulse rate exceeds the error event pulse rate so the integrator output signal 20 remains at the first boundary threshold (α).

In the third period from time t2 to time t3, the receiver receives data with a short burst of intermittent errors. In this period, when the error event pulse rate exceeds the reference pulse rate the integrator output signal 20 approaches the second boundary threshold ("0") and when the reference pulse rate exceeds the error event pulse rate the integrator output signal 20 approaches the first boundary threshold (α). The amount by which the error event pulse rate exceeds the reference pulse rate and the length of time during which the error event pulse rate exceeds the reference pulse rate, however, is insufficient to reduce the value of the integrator output signal 20 to a level at or below the second decision threshold β.

In the fourth period from time t3 to time t4, the reference pulse rate exceeds the error event pulse rate so the integrator output signal 20 remains at the first boundary threshold (α).

In the next period after time t4, the receiver receives data with a long burst of intermittent errors. In this period, the amount by which the error event pulse rate exceeds the reference pulse rate and the length of time during which the error event pulse rate exceeds the reference pulse rate is sufficient to reduce the value of the integrator output signal 20 to a level at and below the second decision threshold β, at which point (t5) the decision signal 22 ($O_{Decision}$) is set to the second value ("0") indicating that the communications link should be taken out of service.

As shown in FIGS. 3A and 3B, integrator output values between the first boundary threshold (which in this case is the same value as the first decision threshold α and the second decision threshold β correspond to the normal operating range 32 of the communications link health monitor circuit. In the illustrated embodiment, the decision circuit outputs the decision signal ($O_{Decision}$) with hysteresis. In particular, when the decision circuit is in the low state, the decision signal is set to the second value (i.e., "0"), and when the decision circuit is in the high state, the decision signal is set to the first value (i.e., "1"). When the decision circuit is in the low state, it remains in the low state until the integrator output value is equal to the first decision threshold at which point it switches to the high state. When the decision circuit is in the high state, it remains in the high state until the integrator output value is less than the second decision threshold at which point it switches to the low state. The different values of the first and second thresholds produce the hysteresis in the decision signal. In other embodiments, the first and second thresholds are equal to the same value that is between the first and second boundary thresholds. In these embodiments, there is no hysteresis in the decision signal.

Figure 4:
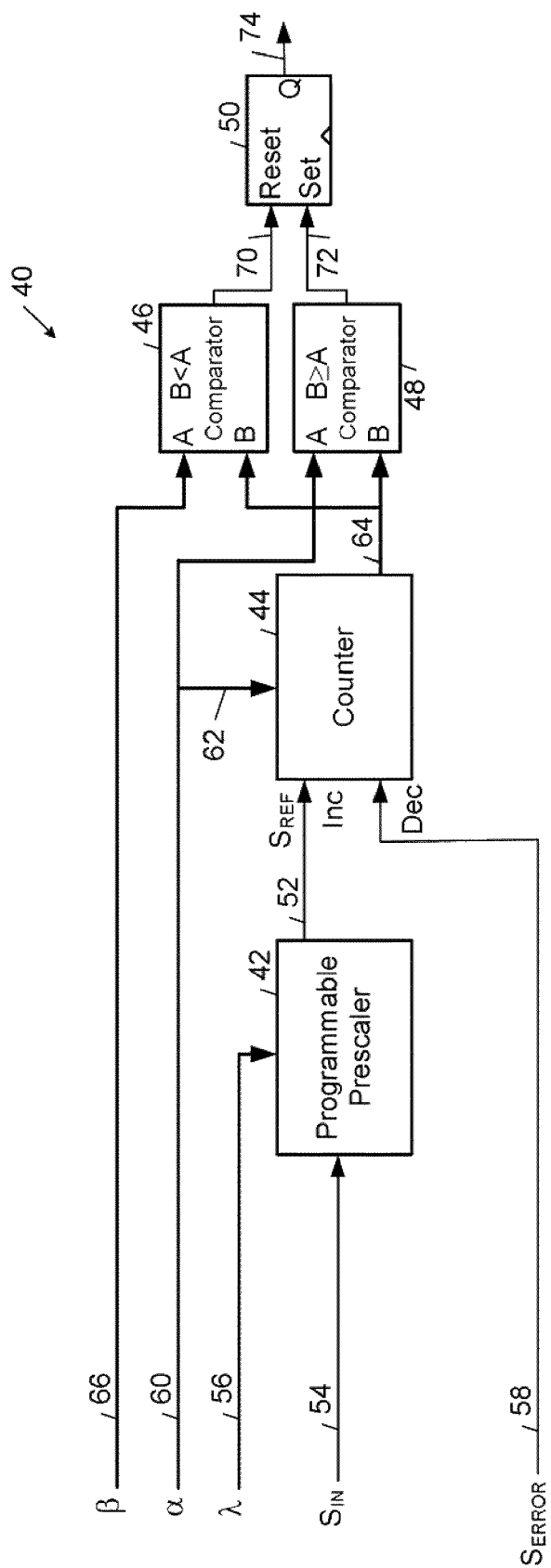
FIG. 4 is a block diagram of an embodiment of the communications link health monitor circuit of FIG. 1.

FIG. 4 shows an exemplary embodiment 40 of the communications link health monitor circuit 10. The communications link health monitor circuit 40 includes a programmable prescaler circuit 42, an up-down counter circuit 44, a first comparator circuit 46, a second comparator circuit 48, and a S-R latch circuit 50.

The prescaler circuit 42 generates a reference signal 52 ($S_{REF}$) from an input signal 54 ($S_{IN}$) based on an input scaling parameter 56 (λ). The reference signal 52 has a uniform reference pulse rate that is set by the value of the input scaling parameter 56. The reference signal 52 is input into an incrementing input of the counter 44 so that each pulse of the reference signal 52 increments the current count tallied by the counter circuit 44. An error event signal 58 ($S_{ERROR}$) is input into a decrementing input of the counter circuit 44 so that each pulse of the error event signal 58 decrements the current count tallied by the counter circuit 44. The error event signal 58 typically is produced by an error detector that produces a pulse in response to each detection of a communications link error. The error event pulses in the error event signal 58 occur at a variable error event pulse rate.

The first decision threshold 60 (α) is applied to an upper bound input 62 of the counter circuit 44 to set the upper count limit of the counter circuit 44. The output 64 of the counter circuit 44 is applied to the second (6) inputs of the first and second comparator circuits 46, 48.

The first decision threshold 60 (α) is applied to the first input (A) of the second comparator circuit 48 and the second decision threshold 66 (β) is applied to the first input (A) of the first comparator circuit 46. The first comparator circuit 46 produces an output 70 that is high when the second decision threshold 66 (β) exceeds the output 64 of the counter circuit 64. The second comparator circuit 48 produces an output 72 that is high when the output 64 of the counter circuit 64 is equal to or greater than the first decision threshold 60 (α). The outputs 70, 72 of the first and second comparator circuits 46, 48 are applied to the Reset and Set inputs of the S-R latch circuit 50, respectively. When the S-R latch circuit 50 is in the reset state, the output 74 of the S-R latch circuit 50 is set to the second value (i.e., "0), and when the S-R latch circuit 50 is in the set state, the output 74 of the S-R latch circuit 50 is set to the first value (i.e., "1"). In operation, when the S-R latch circuit 50 is in the reset state, it remains in the reset state until the output of the counter circuit 44 is equal to the first decision threshold 60 (α) at which point it switches to the set state. When the S-R latch circuit 50 is in the set state, it remains in the set state until the output of the counter circuit 44 is less than the second decision threshold 66 (β) at which point it switches to the reset state (see FIGS. 3A and 3B).

Figure 5:
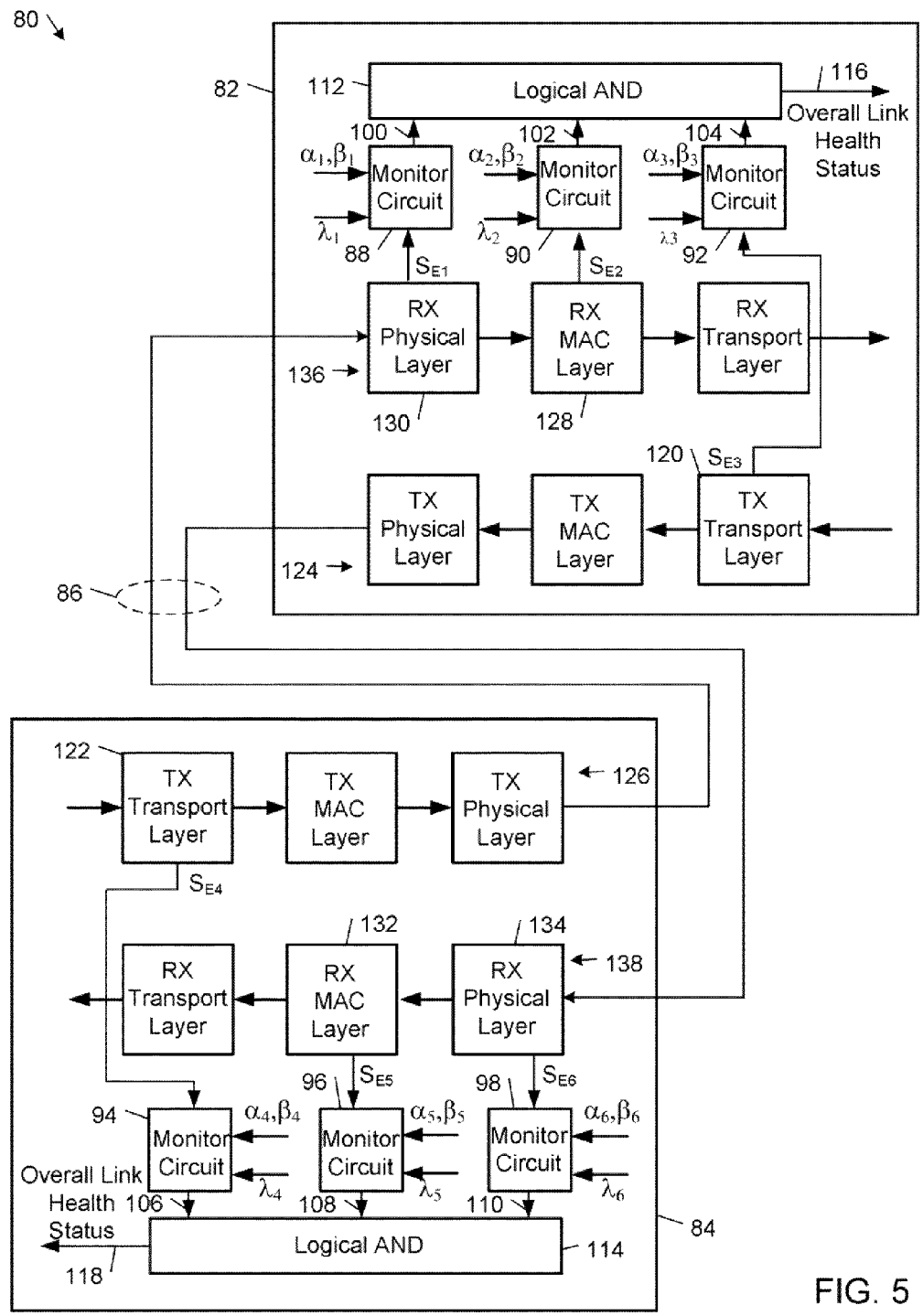
FIG. 5 is a block diagram of an embodiment of a communications system that includes a respective node at each end of a communications link, where each node includes multiple instances of the communications link health monitor circuit of FIG. 1.

FIG. 5 shows an embodiment of a communications system 80 that includes a respective node 82, 84 at opposite ends of a bidirectional communications link 86. Each of the nodes 82, 84 includes a respective instance 88-98 of an embodiment of the communications link health monitor 10. Each of the monitor circuits 88-98 includes a respective instance of the integrator circuit 12 and a respective instance of the decision circuit 14, which produces a respective decision signal 100-110.

Each node 82, 84 also includes a respective combination circuit 112, 114 has a respective input for the respective sets of decision signals 100-104 and 106-110 respectively produced by the monitor circuits 88-92 and 94-98 at the node. Each combination circuit 112, 114 produces a respective output signal 116, 118 from a logical combination of the respective sets of decision signals 100-104, 106-110. Each output signal 116, 118 has a value that indicates the overall health status of the communications link 86. In the illustrated embodiment, the combination circuits 112, 114 logically AND the respective sets of decision signals 100-104, 106-110 to produce the respective output signals 116, 118 with respective values that are high when all of the respective sets of decision signals 100-104, 106-110 are high and that are low when any of the respective sets of decision signals 100-104, 106-110 are low.

The monitor circuits 88-92 and 94-98 in each of the nodes 82, 84 are tuned to monitor different types of communications link errors and to provide an overall indication of the health of the communications link 86 based on these different types of link errors. In this regard, each of the monitor circuits 88-92 and 94-98 in each of the nodes 82, 84 is associated with a different respective set of values for the first threshold ($\alpha_1, \alpha_2, \alpha_3, \alpha_4, \alpha_5, \alpha_6$), the second threshold ($\beta_1, \beta_2, \beta_3, \beta_4, \beta_5, \beta_6$), and the scaling parameter ($\lambda_1, \lambda_2, \lambda_3, \lambda_4, \lambda_5, \lambda_6$).

In the embodiment illustrated in FIG. 5, a first one 88, 94 of the monitor circuits in each of the nodes 82, 84 is coupled to receive its respective error event signal ($S_{E3}$ and $S_{E4}$) from a component 120, 122 (e.g., a TX transport layer component) of a respective transmitter path 124, 126 in the nodes 82, 84. An exemplary type of transmitter path transport layer error event is a transmit resend error in which an error occurs at the far side of the communications link 86 that results in the drop of the received frame. Since the frame was dropped, no acknowledgment is sent from the far side of the link, resulting in the transmit transport layer of the near side of the link having to send the frame again. This type of error gives an indication of the health of the outbound link direction.

The other ones 90-92 and 96-98 of the monitor circuits in each of the nodes 82, 84 is coupled to receive its respective error event signal ($S_{E1}$-$S_{E2}$, $S_{E5}$-$S_{E6}$) from respective components 128-130, 132-134 (e.g., RX MAC and Physical layer components) of a respective receiver path 136, 138 in the nodes 82, 84. An exemplary type of receiver path MAC layer error events are receive frame drop errors resulting from receive frame cyclical redundancy checking (CRC) errors. This type of error could be caused by poor channel equalization, noise in the channel, crosstalk, etc. This type of error gives an indication of the health of the inbound link direction. An exemplary type of receiver path physical layer error events are clock data recovery warnings/errors which might result from excessive jitter or clock mismatch. This type of error gives an indication of the health of the inbound link direction.

By monitoring both inbound and output error events, the monitor circuits in each of the nodes 82, 84 can determine the overall health of the communications link 86.

III. Conclusion

The embodiments that are described herein provide improved communications link health monitoring systems and methods that are capable of automatically distinguishing acceptable non-detrimental bursts of intermittent errors from unacceptable detrimental bursts of intermittent errors in a way that can be readily tailored for monitoring different types of communications error. Some embodiments combine the outputs of multiple communications link health monitors, which are tuned to monitor different types of communications link errors, to provide an overall indication of the health of a communications link.

Other embodiments are within the scope of the claims.

The invention claimed is:

1. Apparatus, comprising:
    an integrator circuit comprising a first input for receiving a reference signal of reference pulses occurring at a uniform reference pulse rate and a second input for receiving an error event signal of error event pulses occurring at a variable error event pulse rate corresponding to a rate of detected error event occurrences, wherein the integrator circuit is operable to produce from the reference signal and the error event signal an integrator output signal with a value that approaches a first boundary threshold when the reference pulse rate exceeds the error event pulse rate and approaches a second boundary threshold when the error event pulse rate exceeds the reference pulse rate; and
    a decision circuit that has an input coupled to receive the integrator output signal from the integrator circuit, wherein the decision circuit is operable to set a decision signal with a first value in response to a determination that the value of the received integrator output signal meets a first decision threshold, wherein the decision circuit is operable to set the decision signal to a second value in response to a determination that the value of the received integrator output signal meets a second decision threshold.

2. The apparatus of claim 1, wherein the integrator circuit comprises a counter that tallies a count from a combination of the reference pulses counted in a first count direction and the error event pulses counted in a second count direction.

3. The apparatus of claim 2, wherein the counter saturates at the first boundary threshold in the first count direction and saturates at the second boundary threshold in the second count direction, and the first and second decision thresholds are between the first boundary threshold and the second boundary threshold.

4. The apparatus of claim 3, wherein the counter is incremented in response to each reference pulse and is decremented in response to each error event pulse, the first boundary threshold is higher than the second decision threshold, the first decision threshold is higher than or equal to the second decision threshold, and the second decision threshold is higher than the second boundary threshold.

5. The apparatus of claim 1, wherein the decision circuit comprises:
    a first comparator operable to compare the value of the received integrator output signal with the first decision threshold;
    a second comparator operable to compare the value of the received integrator output signal with the second decision threshold; and
    an output circuit coupled to the first comparator and the second comparator and operable to produce the decision signal.

6. The apparatus of claim 1, further comprising multiple monitor circuits each comprising a respective instance of the integrator circuit and a respective instance of the decision circuit that produces a respective decision signal, and a combination circuit having a respective input for each decision signal and being operable to produce an output signal from a logical combination of the decision signals.

7. The apparatus of claim 6, wherein all the monitor circuits are associated with a first end of a bidirectional communications link.

8. The apparatus of claim 7, wherein a first one of the monitor circuits is coupled to receive its respective error event signal from a component of a receiver path coupled to the first end of the bidirectional communications link.

9. The apparatus of claim 8, wherein a second one of the monitor circuits is coupled to receive its respective error event signal from a component of a transmitter path coupled to the first end of the bidirectional communications link.

10. The apparatus of claim 6, wherein each of the monitor circuits is associated with a different respective set of values for the first threshold, the second threshold, and the reference pulse rate.

11. A method, comprising:
receiving a reference signal of reference pulses occurring at a uniform reference pulse rate;
receiving an error event signal of error event pulses occurring at a variable error event pulse rate corresponding to a rate of detected error event occurrences;
producing from the reference signal and the error event signal an integrator output signal with a value that approaches a first boundary threshold when the reference pulse rate exceeds the error event pulse rate and approaches a second boundary threshold when the error event pulse rate exceeds the reference pulse rate; and
setting a decision signal to a first value in response to a determination that the value of the received integrator output signal meets a first decision threshold and setting the decision signal to a second value in response to a determination that the value of the received integrator output signal meets a second decision threshold.

12. The method of claim 11, further comprising tallying a count from a combination of the reference pulses counted in a first count direction and the error event pulses counted in a second count direction.

13. The method of claim 12, wherein the tallying saturates at the first boundary threshold in the first count direction and saturates at the second boundary threshold in the second count direction, and the first and second decision thresholds are between the first boundary threshold and the second boundary threshold.

14. The method of claim 13, wherein the tallying comprises incrementing the count response to each reference pulse and decrementing the count in response to each error event pulse, the first boundary threshold is higher than the second decision threshold, the first decision threshold is higher than the second decision threshold, and the second decision threshold is higher than the second boundary threshold.

15. The method of claim 11, further comprising:
receiving multiple reference signals of respective reference pulses occurring at respective uniform reference pulse rates;
receiving multiple error event signals of respective error event pulses occurring at respective variable error event pulse rates corresponding to respective rates of different detected error event occurrences;
for each of multiple pairing of a respective one of the reference signals with a respective one of the error event signals,
producing a respective integrator output signal with a value that approaches a respective first boundary threshold when the reference pulse rate exceeds the error event pulse rate and approaches a respective second boundary threshold when the error event pulse rate exceeds the reference pulse rate, and
outputting a respective decision signal that has a respective first value in response to a determination that the value of the respective integrator output signal meets a respective first decision threshold and has a second value in response to a determination that the value of the respective integrator output signal meets a respective second decision threshold; and
generating an output signal from a logical combination of the decision signals.

16. The method of claim 15, wherein all the error event signals are associated with a first end of a bidirectional communications link.

17. The method of claim 16, wherein the receiving comprises receiving a first one of the respective error event signals from a component of a receiver path coupled to the first end of the bidirectional communications link.

18. The method of claim 17, wherein the receiving comprises receiving a second one of the respective error event signals from a component of a transmitter path coupled to the first end of the bidirectional communications link.

19. The method of claim 15, wherein, for each pairing of the respective reference signal with the respective error event signal, the producing is performed with a different respective set of values for the first threshold and the second threshold.

20. Apparatus, comprising:
means for receiving a reference signal of reference pulses occurring at a uniform reference pulse rate;
means for receiving an error event signal of error event pulses occurring at a variable error event pulse rate corresponding to a rate of detected error event occurrences;
means for producing from the reference signal and the error event signal an integrator output signal with a value that approaches a first boundary threshold when the reference pulse rate exceeds the error event pulse rate and approaches a second boundary threshold when the error event pulse rate exceeds the reference pulse rate; and
means for setting a decision signal to a first value in response to a determination that the value of the received integrator output signal meets a first decision threshold and setting the decision signal to a second value in response to a determination that the value of the received integrator output signal meets a second decision threshold.

* * * * *